Dec. 18, 1962 A. E. CIMOCHOWSKI 3,068,932
METHOD FOR FORMING GROOVES IN METAL
Original Filed Dec. 26, 1957
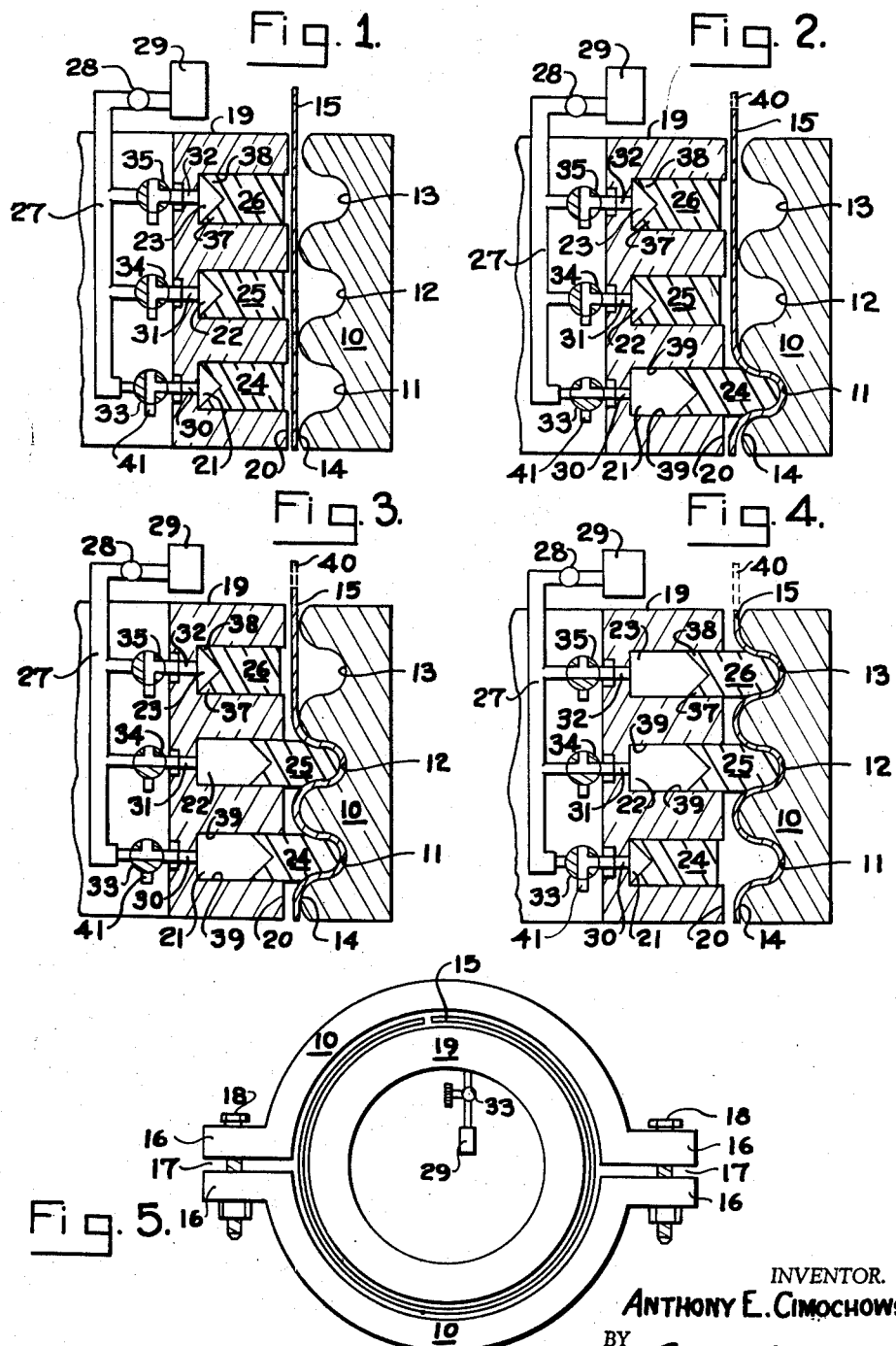
INVENTOR.
ANTHONY E. CIMOCHOWSKI
BY
ATTORNEY

United States Patent Office 3,068,932
Patented Dec. 18, 1962

3,068,932
METHOD FOR FORMING GROOVES IN METAL
Anthony E. Cimochowski, Somerville, N.J., assignor to Johns-Manville Corporation, New York, N.Y., a corporation of New York
Original application Dec. 26, 1957, Ser. No. 705,220, now Patent No. 2,960,142, dated Nov. 15, 1960. Divided and this application Jan. 28, 1960, Ser. No. 5,283
1 Claim. (Cl. 153—73)

This invention relates to a method for producing grooves in thin metal sheets and is particularly directed to the grooving of stainless steel and titanium metals. This application is a division of my copending application Serial No. 705,220 filed December 26, 1957, now Patent No. 2,960,142 entitled Hydro Rubber Forming of Metal.

The usual procedure in the industry when it is desired to form grooves in round or elliptical sheet metal parts is to use a hydroforming process. In this process, the metal is stretched into the grooves and is therefore limited to operations wherein the stretching does not exceed the possible elongation of the metal. Also, the stretching may cause excessive thinning of the metal in the grooved sections resulting in many instances in structural deficiencies. This is particularly true in the formation of generally tubular insulating structures for airplanes where a circumferentially grooved metal inner skin is required to withstand relatively large collapsing forces. These structures require grooves of optimum depth to provide the most strength for the least weight. The problem is further increased in that for maximum efficiency the structures must often be made from titanium, which has small elongation characteristics. The usual method of hydroforming cannot produce the required structure since the necessary stretching involved therein causes serious structural failures.

It is accordingly a primary object of this invention to provide a simple and efficient method for forming grooves in metal sheets wherein stretching of the metal is not relied upon in forming the grooves.

The instant invention accomplishes the foregoing object by a hydro-rubber-forming of the metal sheet in which the grooves are essentially drawn into the metal. A plug having a plurality of outwardly expandable rubber rings actuated by fluid pressure cooperates with a female die to form the desired grooves in a thin sheet of metal, such as titanium. The grooves are formed in sequence working away from the first groove toward the end of the metal sheet. This drawing operation is distinguished from the stretching operation in that there is a shortening of the transverse axial length of the metal sheet. The resultant grooved metal sheet has no structural deficiencies in the grooved portion.

The invention will be more fully understood and further objects and advantages thereof will become apparent when reference is made to the following detailed description of a preferred embodiment of the invention and the accompanying drawings in which:

FIGS. 1–4 are sectional views of a schematic representation of a hydro-rubber-forming apparatus and illustrate the sequential forming of each groove; and FIG. 5 is a rotated bottom plan view of the hydro-rubber-forming apparatus.

In FIGS. 1–4, there is illustrated an apparatus for the hydro-rubber-forming of a metal sheet. A cylindrical female die 10 has a plurality of annular generally radially extending grooves 11, 12 and 13 with corresponding annular generally radially extending lands 14 formed therein and is adapted to receive the metal sheet 15 in which the grooves are to be formed. The grooves 11, 12 and 13 are slightly larger than the desired finished grooves in the metal sheet because of the phenomenon of "spring back," in accordance with which the drawn metal tends to regain, to a slight extent, its original shape, upon release of the drawing force. This "spring back," which occurs in hydro-rubber-forming of metal, requires the pitch in the grooves of the die to be smaller and the depth of the grooves in the die to be larger than the desired finished grooves. The "spring back" can be predetermined and is therefore compensated for in the dimensioning and shaping of the female die 10. As illustrated in FIG. 5, the die 10 is circular in form and is made in two semi-circular sections. Each section has longitudinal edge flanges 16 with aligned openings 17 through which pass the nuts and bolts 18 to secure the sections together forming the die 10. Although a circular die is described, it is to be understood that the die may be of any desired configuration.

A hollow plug 19 is designed to fit within the die 10 so that the metal sheet 15 is received between the plug 19 and the die 10. Although there appears to be considerable clearance, in FIGS. 1–4, between the die, the metal and the plug, in reality this is a close fit with minimum tolerances. The plug 19 has a plurality of annular generally radially extending fins 20 which are designed to be aligned with the lands 14. The fins 20 form a plurality of circumferential, annular grooves 21, 22 and 23 in the plug 19, which grooves receive the rubber rings 24, 25 and 26, respectively. The rubber rings are sufficiently deformable to assume the shape of the die and in practice, rings having 50–75 durometer reading possess the desired deformability. The rings 24, 25 and 26 may be formed from any suitable elastic medium and the term, rubber, as used in the specification and claim is inclusive of any suitable elastic medium having the desired characteristics.

Hydraulic fluid from a source 29 is pumped through line 27 by pump 28 and passes into the grooves 21, 22 and 23 through passages 30, 31 and 32, respectively, drilled in the plug 19. The path of the fluid is controlled by the two way valves 33, 34 and 35 which are, respectively, connected to the passages 30, 31 and 32 by suitable fittings 42. Each valve 33, 34 and 35 is provided with a drain port 41 which is connected to a common collection sump in any suitable manner. The rubber rings 24, 25 and 26 are each formed with a V-shaped recess formed by lips 37 and 38 so that the action of the hydraulic fluid urges the lips 37 and 38 against the walls 39 of the grooves 21, 22 and 23 to prevent the escape of the hydraulic fluid. The rings 24, 25 and 26 return to normal position by the natural regaining of their original shape upon the release of the hydraulic pressure.

The operation of the apparatus is illustrated in FIGS. 1–4 which disclose the sequential formation of a plurality of grooves in a thin metal sheet. In FIG. 1, the metal sheet 15, in which the grooves are to be formed, is positioned between the die 10 and the plug 19. Hydraulic fluid under pressure is introduced through line 27 and valve 33 into the groove 21 to expand the rubber ring 24 outwardly. As shown in FIG. 2, the ring 24 contacts the metal sheet 15 and forces the metal in the sheet 15 into conformation with the groove 11. The transverse axial length of the metal sheet 15 has been shortened a distance indicated by the dotted line 40. In the next step, FIG. 3, hydraulic fluid is admitted to groove 22 through vlave 34 and passage 31 to expand the ring 25 outwardly. Meanwhile, pressure is maintained on the ring 24 to prevent the metal from being drawn from the groove 11. The ring 25 contacts the metal sheet 15 and forces the metal in the sheet 15 into conformation with the groove 12. The transverse axial length of the metal sheet 15 is further shortened as indicated by the increased length of the dotted line 40. In FIG. 4, there is illustrated the formation of the final groove in the metal sheet 15. The hydraulic fluid pressure may desirably be relieved on the ring 24 by the valve 33 allowing the ring to return to its original shape while the pressure is retained on the ring 25. The hydraulic fluid drains through valve 33 and port 41. Hydraulic fluid is then introduced to the groove 23 through the valve 35 and the passage 32 to expand the ring 26 outwardly. The ring 26 contacts the metal sheet 15 and forces the metal in sheet 15 into conformation with the groove 13. The transverse axial length of the metal sheet 15 has been further shortened as indicated by the increased length of the dotted line 40. The die 10 is then separated and the grooved metal sheet 15 removed.

While the invention has been described in rather full detail, it wil be understood that these details need not be strictly adhered to and that various changes and modifications may suggest themselves to one skilled in the art, all falling within the scope of the invention as defined by the subjoined claim.

What I claim is:

The method of forming grooves in a thin metal sheet using a die having a plurality of spaced circumferential grooves in the inner periphery thereof and a plug having a plurality of grooves in the outer periphery thereof wherein said plug is placed within said die so that said grooves in said plug are aligned with said grooves in said die and so that there exists a space between said plug and said die, and wherein a blank metal sheet is formed into a configuration similar to that of said space between said plug and said die and inserted between said plug and said die, said method comprising exerting a first force through the lowermost groove in said plug to conform a first portion of said metal sheet to the lowermost groove of said die, maintaining said first force on said first portion of said metal sheet in said lowermost die groove, exerting a second force through the second lowermost groove in said plug to conform a second portion of said metal sheet to the second lowermost groove in said die, releasing said first force acting through said lowermost groove while maintaining said second force on said second portion of said metal sheet in said second lowermost die groove, exerting a third force through the third lowermost groove in said plug to conform a third portion of said metal sheet to the third lowermost groove in said die, and repeating these steps in sequence for the formation of the desired number of grooves in said metal sheet.

References Cited in the file of this patent

UNITED STATES PATENTS

| | | |
|---|---|---|
| 1,488,504 | Keyes | Apr. 1, 1924 |
| 1,801,498 | Fulton | Apr. 21, 1931 |
| 1,867,581 | Marietta | July 19 1932 |
| 2,372,917 | Tuttle | Apr. 3, 1945 |
| 2,426,949 | Puster | Sept. 2, 1947 |
| 2,773,538 | De Mers | Dec. 11, 1956 |